(12) United States Patent
Yanagida

(10) Patent No.: US 6,609,528 B2
(45) Date of Patent: Aug. 26, 2003

(54) METHOD FOR PRODUCING SAPONIFIED ETHYLENE-VINYL ACETATE COPOLYMER

(75) Inventor: Noboru Yanagida, Okayama (JP)

(73) Assignee: Kuraray Co., Ltd., Kurashiki (JP)

(*) Notice: Subject to any disclaimer, the term of this patent is extended or adjusted under 35 U.S.C. 154(b) by 129 days.

(21) Appl. No.: 09/933,677

(22) Filed: Aug. 22, 2001

(65) Prior Publication Data

US 2002/0045730 A1 Apr. 18, 2002

(30) Foreign Application Priority Data

Aug. 24, 2000 (JP) ........................... 2000-253324

(51) Int. Cl.[7] ................................ B08B 3/04
(52) U.S. Cl. ................... 134/25.1; 134/25.5; 134/26; 134/18
(58) Field of Search ............... 134/25.1, 25.5, 134/18, 26

(56) References Cited

U.S. PATENT DOCUMENTS

| | | |
|---|---|---|
| 2,759,914 A | 8/1956 | Kenyon et al. |
| 3,905,946 A | 9/1975 | Nieswandt et al. |
| 4,058,904 A | 11/1977 | Takida et al. |
| 6,242,087 B1 * | 6/2001 | Kawai ........................ 428/336 |
| 6,485,842 B1 * | 11/2002 | Shindome et al. .......... 428/522 |

FOREIGN PATENT DOCUMENTS

JP  50-4188  1/1975

* cited by examiner

Primary Examiner—Zeinab El-Arini
(74) Attorney, Agent, or Firm—Oblon, Spivak, McClelland, Maier & Neustadt, P.C.

(57) ABSTRACT

A method for producing a saponified ethylene-vinyl acetate copolymer, which comprises washing chips of a saponified ethylene-vinyl acetate copolymer. In this method, the chips containing impurities and methanol are introduced into a washing column through an upper portion thereof; water is introduced into the washing column through a lower portion thereof; while the methanol concentration in the solution in the upper portion of the column is maintained in the range of 25 to 45 wt % and the chips are allowed to fall (i.e. sink) from the upper portion of the column, methanol and water with at least a part of the impurities are discharged from the column through an upper portion thereof; and the chips are taken out of the column through a lower portion thereof with water that contains methanol in a lower concentration than the methanol concentration in the solution in the upper portion of the column. According to this method, a saponified ethylene-vinyl acetate copolymer is produced efficiently and safely, and visual imperfections are inhibited when the saponified copolymer is formed into a molded product such as a film.

11 Claims, 1 Drawing Sheet

METHOD FOR PRODUCING SAPONIFIED ETHYLENE-VINYL ACETATE COPOLYMER

FIELD OF THE INVENTION

The present invention relates to a method for producing a saponified ethylene-vinyl acetate copolymer (hereinafter abbreviated as "EVOH").

BACKGROUND OF THE INVENTION

In the production of EVOH, it is necessary to remove impurities remaining or adhering on chips (also may be referred to as pellets), since they cause discoloration or fish eyes at the time of molding into a film or the like. Furthermore, the solvent used in the production, such as methanol, needs to be recovered as much as possible from the viewpoint of economic efficiency and reducing pollution.

To remove impurities and methanol from chips, conventionally, a method in which chips are washed by bringing them into contact with water, and thereafter repeating the step of centrifugal dewatering, has been employed. However, this washing method requires a large amount of water and takes a long time.

JP 50(1975)-4188A proposes a method in which a solution containing EVOH chips is introduced into a washing column (tower-type apparatus) through an upper portion thereof, and a washing solution containing an acetic acid ester is introduced into the washing column through a lower portion thereof, and these solutions are brought into contact with each other while flowing in countercurrent to each other, thereby continuously washing the chips. This method is excellent in the efficiency of washing. However, the use of an acetic acid ester as a washing solution is associated with problems with respect to safety and cost.

DISCLOSURE OF THE INVENTION

Thus, it is desirable to provide a method for producing EVOH efficiently and safely, in which the washing process of EVOH chips is improved, and thus in which visual imperfections are inhibited when the EVOH is formed into a molded product such as a film.

The present invention provides a method for producing EVOH, which comprises washing EVOH chips, wherein the chips containing methanol are introduced (preferably continuously) into a washing column through an upper portion thereof; water is introduced (preferably continuously) into the washing column through a lower portion thereof; while the methanol concentration in the solution in the upper portion of the column is maintained in the range of 25 to 45 wt % and the chips are allowed to fall from the upper portion of the column, methanol and water are discharged (e.g. continuously) from the column through an upper portion thereof; and the chips are taken out of the column (e.g. continuously) through a lower portion thereof with water that contains methanol in a lower concentration than the methanol concentration in the solution in the upper portion of the column. According to this method, EVOH chips can be washed continuously and safely. When introducing chips including impurities with methanol into the column, at least a portion of the impurities can be removed with the solution discharged from the upper portion of the column.

In the above method, an adjusting solution including methanol may if necessary be introduced into the washing column through an upper portion thereof.

The assessment of the methanol concentration in the solution in the upper portion of the column should be conducted on solvent contained in the upper 20% of the column volume. Preferably, the assessment is made on solvent in the top 5%, more preferably the top 2% of the column volume. In these cases, an average concentration of methanol in the solvent is defined as the methanol concentration. Most preferably the assessment of methanol concentration is made by testing the solution discharged from the upper portion of the column.

Sodium acetate is one of the impurities which is particularly desirable to remove from the EVOH chips so as to inhibit visual imperfections of an EVOH molded product. Thus, in the above method, it is preferable that the EVOH chips are washed so that the content of sodium acetate in the chips taken out of the column is not more than 500 ppm, preferably 200 ppm (by weight throughout, unless otherwise stated).

Furthermore, it is preferable that the methanol concentration in the chips taken out of the column is not more than 10,000 ppm.

DESCRIPTION OF THE PREFERRED EMBODIMENT

Figure 1:
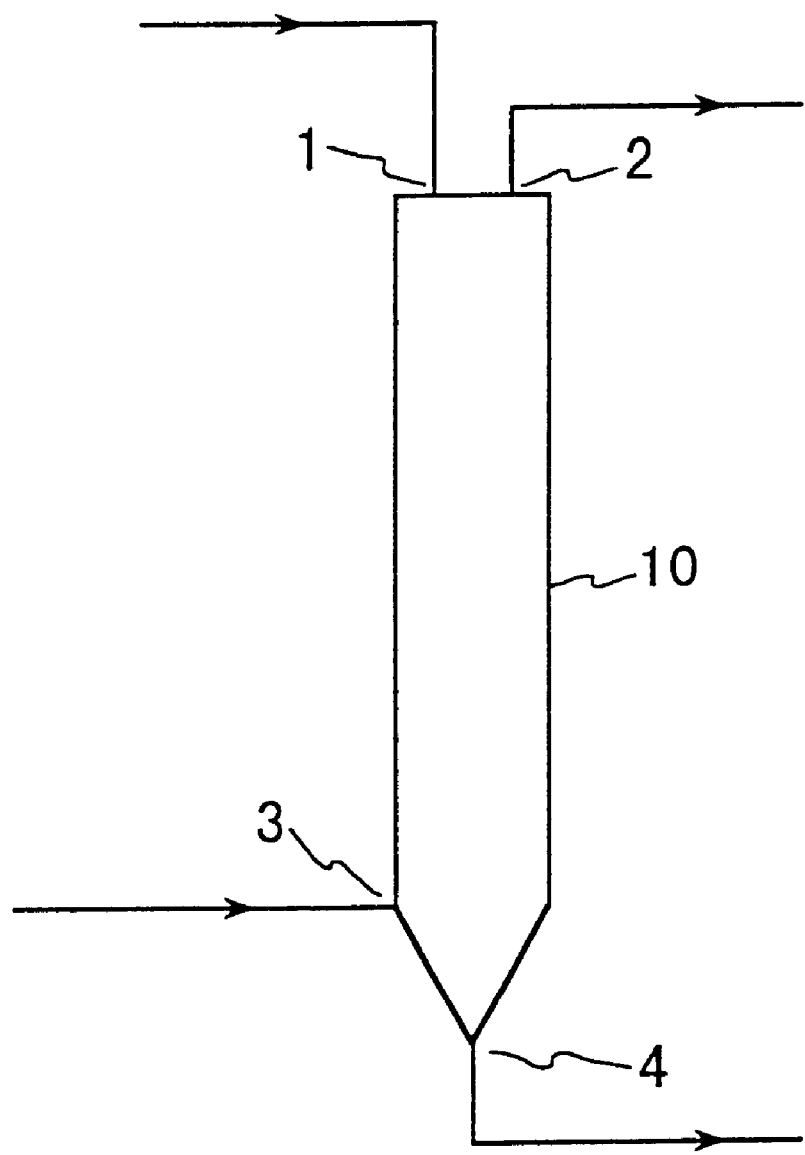
FIG. 1 shows an example of a washing column for carrying out the method of the present invention.

In the following, a preferred embodiment of the present invention is described with reference to FIG. 1.

From the viewpoint of washing ability, safety, cost, etc., water is suitable as the washing solution for the EVOH chips. Taking into consideration the efficiency of washing, countercurrent flow contact between the chips and the washing solution using a washing column is suitable. The EVOH chips to be washed contain a large amount of methanol having a lower specific gravity than that of water. Therefore, although depending on the methanol content, water content, and conditions of production, etc., the specific gravity of the EVOH chips is generally about the same as or less than that of water. The phenomenon in which EVOH is essentially buoyant in water has been confirmed in conventional washing processes. Moreover, in the washing with countercurrent flow, it is necessary to cause the chips to fall (i.e. sink) against the ascending current of water. Thus, conventionally, washing of EVOH chips by bringing them into contact with water while flowing in countercurrent to the water has not been achieved.

Methanol has a lower specific gravity than that of water. Thus, when the EVOH chips are supplied into the solution in the upper portion of the washing column while adjusting the concentration of methanol in this solution, it is found that the chips continuously fall (i.e. sink). Thus, it was found that continuous washing of EVOH with water is possible.

It is preferable that the methanol concentration in the solution in the upper portion of the column is in the range of 25 to 45 wt %. When the methanol concentration is too low, the chips may stop in the upper portion of the column. When the methanol concentration is too high, it is necessary to increase the height of the column for washing, and this is disadvantageous in the aspect of cost. From these viewpoints, although depending on the conditions of the chips to be washed, it is more preferable that the methanol concentration is at least 27 wt %, more preferably not more than 40 wt % in the upper portion of the column.

EVOH chips obtained by a conventional production process contain methanol. In this case, at least part of the methanol in the solution in the upper portion of the column is supplied from the EVOH chips. The methanol content in the EVOH chips depends on the production conditions, particularly the concentration of the paste after saponification, the temperature and the solution composition of the bath where the paste is coagulated, etc. The methanol content is usually approximately 13 to 24 wt % of the chips to be washed. This methanol rises in the column after being washed away from the chips to form part of the solution in the upper portion of the column. On the other hand, the EVOH chips fall (i.e. sink) in the column as the methanol in the chips is gradually replaced by water. In the solution composition in the column, at a lower position, the methanol concentration is lower, and the specific gravity is higher. Thus, the buoyancy of the chips is greater at a lower position. On the other hand, at a lower position, lower methanol content and higher water content raise the specific gravity of the settling chips. These effects compensate for each other, and as a result, the chips arrive at the lower portion of the column essentially without stopping during their descent.

The methanol concentration in the solution in the upper portion of the column can be adjusted by controlling the flow rate of water supplied through the lower portion of the column. However, there is an appropriate range of the flow rate of water for washing the EVOH chips while allowing the chips to fall. Thus, controlling the methanol concentration only by the flow rate of water may have limitations. Particularly, at the initial stage of washing, the methanol concentration may not be constant. In such a case, an adjusting solution may be introduced into the column through an upper portion thereof separately from the water for washing.

The adjusting solution is not particularly limited as long as it includes methanol, and methanol alone may be supplied. It is preferable to use a mixture of methanol and water. The flow rate and the composition (ratio) of the adjusting solution may be changed as appropriate while washing EVOH.

Although it depends on the production conditions, etc., the EVOH chips before washing generally contain approximately 5,000 to 15,000 ppm of sodium acetate. Sodium acetate is a by-product formed in the saponification of an ethylene-vinyl acetate copolymer (EVAc), and causes discoloration or fish eyes at the time of molding into a film or the like. It is preferable that the concentration of sodium acetate is decreased to not more than 200 ppm, particularly to not more than 50 ppm by countercurrent flow contact with water.

A major portion of the methanol supplied into the column, which is contained in the chips, can be recovered by discharging it from the washing column through an upper portion thereof with the methanol optionally supplied as an adjusting solution. Usually, the solution discharged from the column with the chips also includes a small amount of methanol. The methanol concentration in the discharged solution is lower than that in the solution in the upper portion of the column, and for example, it is not more than 1 wt %, preferably not more than 0.2 wt %. Thus, the chips taken out of the column also contain a trace of methanol. Because this methanol is released into the atmosphere at the subsequent drying step, the methanol content should be as small as possible from the viewpoints of economic efficiency and reducing pollution. It is preferable that the methanol concentration in the chips is not more than 10,000 ppm, more preferably not more than 5000 ppm, particularly preferably not more than 2000 ppm.

In order to wash the chips effectively, although not particularly critical, it is preferable that the temperature in the column is between 15° C. and 60° C. As long as desirable results can be achieved, the water as the washing solution supplied into the column may include other minor components.

An embodiment of continuous washing of EVOH chips is further described with reference to FIG. 1. Chips to be washed are continuously introduced into a washing column 10 through an upper portion 1 thereof, and as needed, a methanol-water mixture solution also is introduced into the column 10 through the upper portion 1. On the other hand, water is continuously introduced into the column 10 through a lower portion 3 thereof. The content of impurities and methanol in the chips decreases as the EVOH chips fall (i.e. sink) to the lower portion in the column. The EVOH chips fall while being brought into contact with water that flows in countercurrent to the chips. The EVOH chips thus washed are continuously taken out of the column through a bottom portion 4 thereof. The methanol concentration in the solution of methanol and water in the upper portion of the column is adjusted to the above-specified range. This methanol concentration can be controlled by measuring the concentration of a solution taken out of the column through an upper portion 2 thereof.

The position from which water is fed into the column is not limited to the position illustrated in FIG. 1. Water may be fed into the column from any position which allows the EVOH chips to be washed continuously, and may be from two or more positions. Other illustrated positions for feeding and discharging are also exemplary.

The EVOH chips to be treated may be produced by a conventional method. The EVOH chips can be obtained by saponifying an ethylene-vinyl acetate copolymer (EVAc), extruding the saponified copolymer into a coagulation bath (water or a methanol-water mixture), and cutting. Although the size of the EVOH chips to be washed is not particularly critical, it is preferable that the apparent volume of the chips is approximately 10 to 100 mm$^8$.

It is preferable that the EVOH has an ethylene content of 20 mol % to 70 mol %, and a saponification degree of at least 90 mol %. When the ethylene content is too low, water resistance of the EVOH is decreased. When the ethylene content is too high, gas barrier properties such as oxygen shielding properties of the EVOH are decreased. When the saponification is not carried out sufficiently, satisfactory gas barrier properties also cannot be obtained. From these viewpoints, it is more preferable that the ethylene content is from 25 to 60 mol %, and the saponification degree is at least 95 mol %, particularly at least 99 mol %.

It is preferable that the melt index (MI) of the EVOH is from 0.1 to 200 g/10 min. As the MI, a value measured at 190° C. and under a load of 2160 g is used. However, with respect to an EVOH having a melting point of around 190° C. or exceeding 190° C., a plurality of measured values under the above-specified load and at temperatures of not less than the melting point are plotted as a semi-logarithmic graph with the inverse of the absolute temperature on the horizontal axis and MI on the vertical axis (logarithmic scale), and a value extrapolated at 190° C. is used as the MI.

The washed EVOH chips are molded into various forms such as films, sheets, containers, pipes, fibers and the like by melt molding. Melt molding may be effected by extrusion molding, inflation, blow molding, melt spinning, injection molding, etc. It is preferable that the melting temperature is from 150° C. to 270° C. A blend of at least two kinds of EVOH different in polymerization degree, ethylene content, saponification degree and the like may be melt molded. Furthermore, plasticizers, stabilizers, surfactants, crosslinking agents, metal salts, fillers, reinforcing agents such as various types of fibers, etc. may be added to the EVOH in advance.

A thermoplastic resin other than EVOH may be mixed with the EVOH. Examples of the thermoplastic resin include polyolefins (polyethylene, polypropylene, poly-1-butene, poly-4-methyl-1-pentene, ethylene-propylene copolymers, copolymers of ethylene and an α-olefin having at least 4 carbon atoms, copolymers of a polyolefin and maleic anhydride, ethylene-vinyl acetate copolymers, ethylene-acrylic acid ester copolymers, modified polyolefins in which these polyolefins are grafted with an unsaturated carboxylic acid or its derivative, etc.), various types of nylons (nylon 6, nylon 66, nylon 6/nylon 66 copolymers, etc.), polyvinyl chloride, polyvinylidene chloride, polyester, polystyrene, polyacrylonitrile, polyurethane, polyacetal, modified polyvinyl alcohol resin, and the like.

Furthermore, the EVOH may be formed into a laminate, for example, by coextruding the EVOH with a thermoplastic resin such as those exemplified above. Furthermore, the EVOH may be formed into a laminate with a substrate film such as paper, plastic film, metal foil or the like, and may be coated on the surface of these substrate films by coextrusion coating, solution coating or the like.

EXAMPLES

In the following, the present invention will be described in more detail with reference to the following non-limiting examples. The water used in the following examples and comparative examples was pure water.

Example

A methanol solution of an EVAc (ethylene content in the EVAc: 32 mol %; EVAc concentration: 35 wt %) and a methanol solution of sodium hydroxide (sodium hydroxide concentration: 15 wt %) were fed into a bubble-cap tower having a diameter of 0.85 m and 20 steps at 1300 kg/h and at 50 kg/h, respectively, through an upper portion thereof. Furthermore, a methanol vapor at 115° C. was blown into the tower at 1100 kg/h through a lower portion thereof, and methyl acetate formed as a by-product was distilled from the tower through an upper portion thereof with a part of the methanol. At this time, the temperature in the tower was between 110° C. and 115° C., the pressure in the tower was 5.5 kg/cm² (about 0.54 MPa), and the residence time of the materials within the tower was 30 minutes. Thus, a methanol solution of an EVOH having a saponification degree of 99.5 mol % was obtained through a lower portion of the tower.

A vapor of a methanol-water mixture was further blown into this solution while the vapor of the methanol-water mixture was distilled. Thus, an EVOH solution (EVOH concentration: 40 wt %) with a methanol-water mixed solvent (methanol/water=65/35; weight ratio) was obtained. This solution was discharged into a coagulation bath having a methanol-water mixed solvent (methanol/water=10/90; weight ratio) at 5° C. through a die with apertures of 2 mm in diameter, and coagulated in the form of strands. The obtained strands were cut by a cutter into chips with a length of 2.5 to 3.5 mm. Thereafter, the chips were subjected to centrifugal deliquoring to obtain water-containing chips. These chips contained 19 wt % water, 19 wt % methanol, and 10,000 ppm sodium acetate.

The chips were introduced into a washing column having a diameter of 0.5 m and a height of 8 m through an upper portion thereof with a methanol-water mixed solvent (methanol/water=30/70, weight ratio) at 150 kg/h. Water for washing at 30° C. was introduced into the column through a lower portion thereof at 200 L/h. While causing the washing water to overflow from the column through an upper portion thereof, and at the same time taking the chips and the washing water containing a small amount of methanol out of the column through a bottom portion thereof, the chips were continuously washed with countercurrent flow. When operating for 24 hours, the chips fell continuously toward a lower portion of the column without stopping or refluxing. The temperature within the middle step of the column was 30° C.

The washing water overflowing from the column contained 30 wt % methanol. Furthermore, the chips recovered from the column contained 100 ppm methanol and 30 ppm sodium acetate.

Comparative Example 1

Except that the flow rate of the washing water introduced into the column was changed to 100 L/h so that the washing water overflowing from the column contained 50 wt % methanol, the chips were washed with a countercurrent flow in the same manner as in the Example. While operated for 24 hours, the chips fell (sank) continuously to a lower portion of the column without stopping or refluxing. The chips recovered from the column contained 15,000 ppm methanol and 1,000 ppm sodium acetate.

Comparative Example 2

Except that the flow rate of the washing water introduced into the column was changed to 400 L/h so that the washing water overflowing from the column contained 20 wt % methanol, the chips were washed with a countercurrent flow in the same manner as in the Example. Because the chips stopped in the upper portion of the column, the operation was discontinued after 3 hours. The chips recovered from the column contained 100 ppm methanol and 30 ppm sodium acetate.

As described above, according to the present invention, by improving the process of washing EVOH chips, an EVOH with fewer visual imperfections, when molded into a film or the like, can be produced efficiently and safely. The present invention has realized the continuous washing of chips by utilizing the fact that the specific gravity of methanol is lower than that of water, thus improving the efficiency and safety of the production of EVOH.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A method for the removal of methanol from chips of a saponified ethylene-vinyl acetate copolymer, said method comprising:
   (a) introducing said chips into a washing column through an upper portion thereof;
   (b) introducing water into the washing column through a lower portion thereof;

(c) discharging a solution comprising methanol and water from the column through an upper portion thereof; and (d) subsequently removing a solution comprising water, methanol and said chips from the column through a lower portion thereof;

wherein the methanol concentration in the solution in the upper portion of the column is maintained in the range of from 25 to 45 wt % such that said chips fall through said column.

2. The method according to claim 1, wherein the solution removed from the column in step (d) has a lower methanol concentration than that of the solution in the upper portion of the column.

3. The method according to claim 1, wherein each of said steps (a) to (d) is carried out continuously.

4. The method according to claim 1, wherein the methanol concentration in the upper portion of the column is adjusted by controlling the flow rate of the water introduced into the washing column.

5. The method according to claim 1, wherein an adjusting solution including methanol is further introduced into the washing column through an upper portion thereof.

6. The method according to claim 1, wherein the chips introduced in step (a) include impurities and the solution discharged in step (c) includes at least a portion of said impurities.

7. The method according to claim 6, wherein the impurities include sodium acetate.

8. The method according to claim 7, wherein the content of sodium acetate in the chips taken out of the column is less than 500 ppm.

9. The method according to claim 8, wherein the content of sodium acetate in the chips taken out of the column is less than 200 ppm.

10. The method according to claim 1, wherein the methanol concentration in the chips taken out of the column is less than 10,000 ppm.

11. The method according to claim 1, wherein the methanol concentration in the chips prior to washing is in the range of from 13 to 24 wt %.

* * * * *